United States Patent [19]

Kicklighter

[11] Patent Number: 6,005,841
[45] Date of Patent: Dec. 21, 1999

[54] REDUNDANCY ARRANGEMENT FOR TELECOMMUNICATIONS SYSTEM

[75] Inventor: Kevin C. Kicklighter, Hyannis, Mass.

[73] Assignee: Excel Switching Corporation, Hyannis, Mass.

[21] Appl. No.: 08/798,603

[22] Filed: Feb. 11, 1997

[51] Int. Cl.$^6$ ...................................................... H04J 1/16
[52] U.S. Cl. .......................... 370/217; 370/221; 370/524; 395/182.09
[58] Field of Search .................................... 370/216, 217, 370/220, 221, 225, 228, 218, 219, 241, 242, 244, 522, 524, 180; 395/181, 182.02, 182.05, 182.06, 182.09, 182.11, 182.13

[56] References Cited

U.S. PATENT DOCUMENTS

| | | | |
|---|---|---|---|
| 4,228,535 | 10/1980 | Workman et al. ....................... | 370/220 |
| 4,730,313 | 3/1988 | Stephenson et al. . | |
| 4,797,884 | 1/1989 | Yalowitz et al. ................... | 395/182.11 |
| 5,014,261 | 5/1991 | Shinbashi et al. ...................... | 370/220 |
| 5,072,440 | 12/1991 | Isono et al. .............................. | 370/220 |
| 5,119,370 | 6/1992 | Terry ....................................... | 370/354 |
| 5,210,740 | 5/1993 | Anzai et al. . | |
| 5,345,438 | 9/1994 | Ozaki ...................................... | 370/220 |
| 5,349,579 | 9/1994 | Madonna et al. . | |
| 5,398,236 | 3/1995 | Hemmady et al. ..................... | 370/218 |
| 5,406,564 | 4/1995 | Okita . | |
| 5,408,462 | 4/1995 | Opoczynski .............................. | 370/220 |
| 5,515,429 | 5/1996 | Kawada et al. . | |
| 5,544,163 | 8/1996 | Madonna . | |
| 5,548,710 | 8/1996 | Oono et al. . | |
| 5,570,345 | 10/1996 | Kaprielian et al. ...................... | 370/228 |
| 5,712,847 | 1/1998 | Hata ........................................ | 370/228 |

FOREIGN PATENT DOCUMENTS 58-186243  10/1983  Japan .

OTHER PUBLICATIONS

* with English abstract from European Patent Office.

*Primary Examiner*—Ajit Patel
*Assistant Examiner*—Bob A. Phunkulh
*Attorney, Agent, or Firm*—Cesari and McKenna, LLP.

[57] ABSTRACT

A redundancy arrangement for use in connection with a programmable telecommunications switch or other device. An active hardware device, such as an ISDN packet engine card, is paired with a substantially identically configured standby device. During operation, the active device, in addition to performing all of its normal functions, also advises the standby device of all events which have an effect on the operational state of the active device. By ensuring that the standby device processes the same events in the same sequence as the active device, the standby device's operational state continuously tracks that of the active device. Should the active device malfunction or be taken out of service, the standby device becomes active without significant interruption or loss of service.

10 Claims, 6 Drawing Sheets

REDUNDANCY ARRANGEMENT FOR TELECOMMUNICATIONS SYSTEM

CROSS-REFERENCES TO RELATED PATENTS

The following commonly-owned patents are related to the present invention and are hereby incorporated by reference:

U.S. Pat. No. 5,544,163, entitled "Expandable Telecommunications System," naming as inventor Robert P. Madonna; and U.S. Pat. No. 5,349,579, entitled "Telecommunications Switch With Programmable Communications Services," naming as inventors Robert P. Madonna and Kevin C. Kicklighter.

BACKGROUND OF THE INVENTION

1. Field Of The Invention

This present invention relates generally to the field of telecommunications and, more specifically, to a redundancy arrangement for use in connection with programmable telecommunications switches.

2. Discussion Of The Related Art

In a telecommunications system, it is often desirable, if not essential, to provide at least one level of redundancy to ensure that the system will continue to operate in the event that one or more parts of the system malfunctions or must be taken out of service. Redundancy may be provided in a number of ways, the choice of which typically depends upon the cost, the importance of a particular device to overall system performance, the degree of difficulty of replacing the device and other factors.

One type of redundancy, often referred to as "one-to-one" redundancy, is based on the concept that each "active" device is matched or paired with an identical "standby" device. In the event that the active device fails, a "cutover" occurs in which the standby device functionally replaces the failed device.

A major disadvantage of conventional one-to-one redundancy is that, at the time of cutover, the original active device and the standby device are in non-identical operating states. Any difference between those operating states will generally result in interruption or loss of service, which may be manifested in the form of dropped calls, calls which fail to connect, and the like. Such degraded performance is generally unacceptable to service providers and customers, at least to the extent that it affects more than a very small percentage of the total call traffic for a very short period of time.

One alternative to the one-to-one redundancy approach is to provide a limited number of standby components which are available to replace some, but not all, of a larger number of active components. This approach is often referred to as "n+1" redundancy where n refers to the number of active components. While the n+1 approach is less costly than the one-to-one approach, there is correspondingly less protection against degraded system performance. That is, in the event that several active devices fail at about the same time and that number exceeds the number of available standby devices, then some loss of service or degradation of performance will occur.

Another disadvantage of the n+1 approach is that because it is not known in advance which one of several active devices may fail, there is no way to maintain a particular standby device in an operating state which matches that of the device which is to be replaced. Consequently, in the n+1 redundancy approach, there is a high likelihood that service will be disrupted during cutover from a failed device to a standby device.

SUMMARY OF THE INVENTION

In brief summary, the present invention provides a redundancy arrangement for use in conjunction with telecommunications switches or other devices or systems. In accordance with a preferred embodiment of the invention, an active hardware device in a telecommunications switch is paired with a substantially identical standby device or mate. After the active device successfully completes its boot sequence, the active device establishes a communication link or channel to its mate. Using that link, the active device then copies all configuration and detailed call processing information to the standby device, thereby ensuring that the standby device will achieve an initial operating state which is identical to that of the active device. After both devices are identically configured, the active device is placed in service while the standby device is placed in a standby or listening mode. Regardless of whether it is operating in the active mode or the standby mode, each device continuously receives all pulse code modulation (PCM) data which is received by the switch.

Once in service, the active device, in addition to performing all of the functions for which it is intended, communicates information to the standby device regarding the occurrence of any event which represents a change in the operating state of the active device. An event may, for example, consist of the receipt of a message or data, the expiration of a timer or any of a number of other incidents. The active device communicates such events to the standby device such that both devices experience the same events, in the same sequence, and therefore respond to those events in the same way. Consequently, even though the standby device is preferably not actually processing calls (even though it receives all incoming PCM data), the standby device nonetheless continuously adjusts its operating state as if it was processing such calls, thereby tracking the operating state of the active device. Thus, in the event that the active device fails or is taken out of service, the standby device is ready to immediately become active in an operating state which is essentially the same as that of the original active device just prior to failure.

The present invention may advantageously be implemented with any pair of matched devices, with multiple pairs of matched devices or other combinations within a system. In a preferred embodiment, the invention is used to provide redundancy for an ISDN Primary Rate packet engine card. In that embodiment, the present invention may be used to provide redundancy for individual D channels, active D channels or standby D channels, or any combination thereof, as well as the entire packet engine card.

BRIEF DESCRIPTION OF THE DRAWINGS

The above and further advantages of the invention may be better understood by referring to the following description in conjunction with the accompanying drawings in which.

DETAILED DESCRIPTION OF THE PREFERRED EMBODIMENTS

Figure 1:
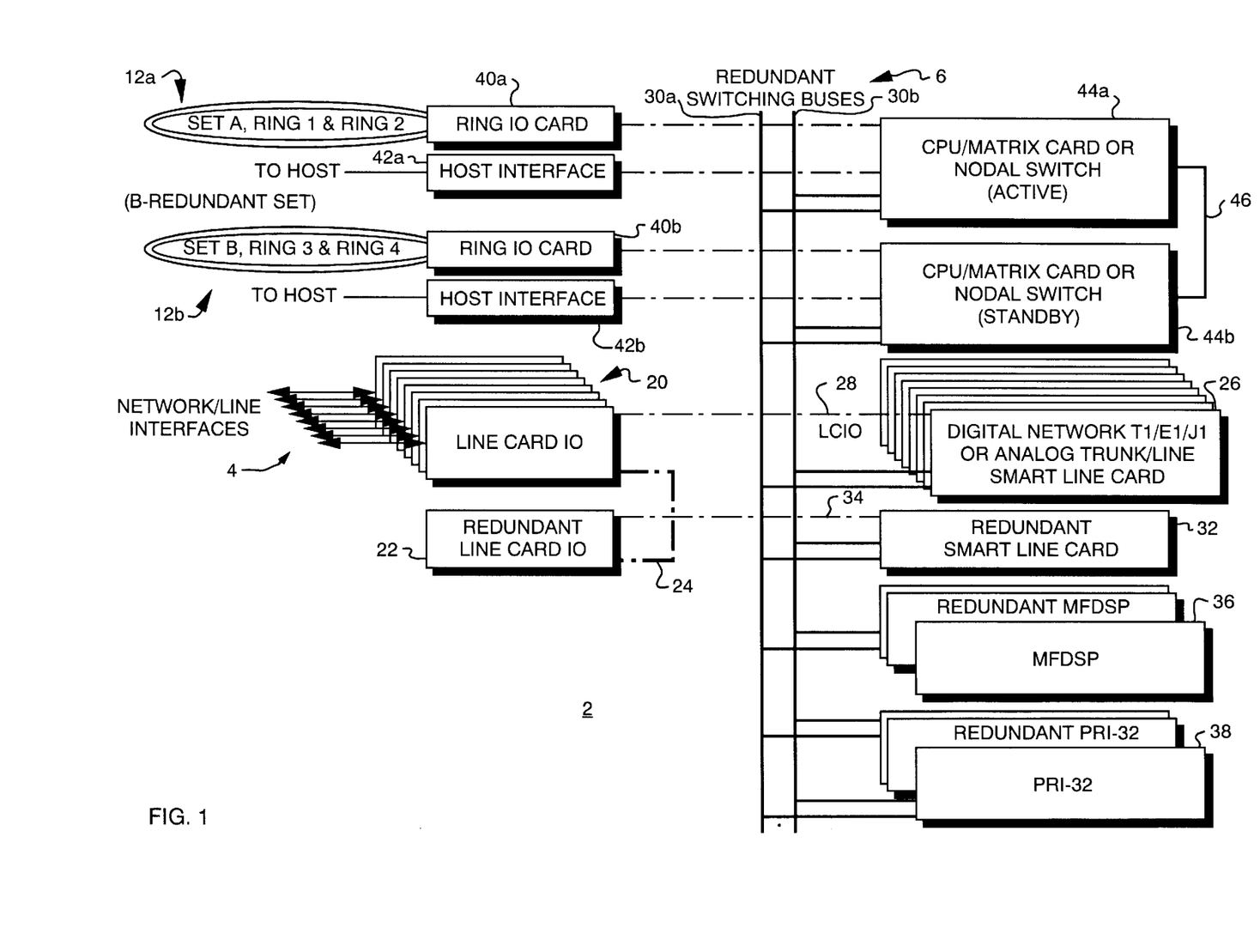
FIG. 1 is a block diagram of a programmable telecommunications switch constructed in accordance with a preferred embodiment of the present invention.

FIG. 1 shows the major functional components of a preferred embodiment of a programmable telecommunications switch 2 in which the present invention may be implemented. Network/line interfaces 4, which may represent links to a public switched telephone network (PSTN) or private network (or both), are provided on a series of line card input/output (IO) cards 20. If desired, a redundant IO card 22 and redundant IO bus 24 may optionally be provided to permit continued operation of the switch in the event of a failure of one of IO cards 20.

One or more digital network (T1, E1 or J1) or analog trunk/line line cards 26 communicate with IO cards 20 over line card (LC) IO lines 28. Line cards 26 are also connected in communicating relationship with redundant switching buses 30a and 30b. Again, if desired, one or more redundant line cards 32 may be provided, such redundant line cards arranged to communicate with a redundant IO card 22 over redundant LC IO lines 34. It should be understood that by providing other types of cards within switch 2, other types of communication protocols such as DS3, SONET, SS7 or others may also be supported by switch 2.

Control of the operations of switch 2, as well as the actual switching functions, are performed by either a CPU/matrix card or nodal switch 44a. If a CPU/matrix card is selected, switch 2 will operate as a standalone device (i.e., as opposed to operating as a switching node in an expandable telecommunications system). In that case, the CPU/matrix card is connected to a host interface 42a through which communications with an external host device (not shown) are effected.

Alternatively, if a nodal switch is selected, switch 2 may operate as a switching node in an expandable telecommunications system. In such an embodiment, the nodal switch is preferably connected with a ring IO card 40a through which communications with a pair of fiber optic rings 12a are effected. The nodal switch may also communicate with an external host via host interface 42a.

Regardless of whether a CPU/matrix card or a nodal switch is selected, a matching standby CPU/matrix card or nodal switch 44b may optionally be provided and accompanied by the appropriate host interface 42b or ring IO card 40b (or both). In such a configuration, a link 46 is provided for direct communication between active and standby devices 44a and 44b.

Details of the construction and operation of a suitable CPU/matrix card may be found in U.S. Pat. No. 5,349,579, incorporated by reference above. Similarly, details of the construction and operation of a suitable nodal switch may be found in U.S. Pat. No. 5,544,163, also incorporated by reference above.

Diverse, programmable communications services such as tone detection and generation, conferencing, voice recorded announcements, call progress analysis, speech recognition, ADPCM compression and many others may be provided by one or more multifunction digital signal processing (MFDSP) cards 36. ISDN Primary Rate service and other packet communications services are provided by one or more PRI-32 packet engine cards 38. Redundant MFSP cards 36 and redundant PRI-32 cards 38 may also be included.

Figure 2:
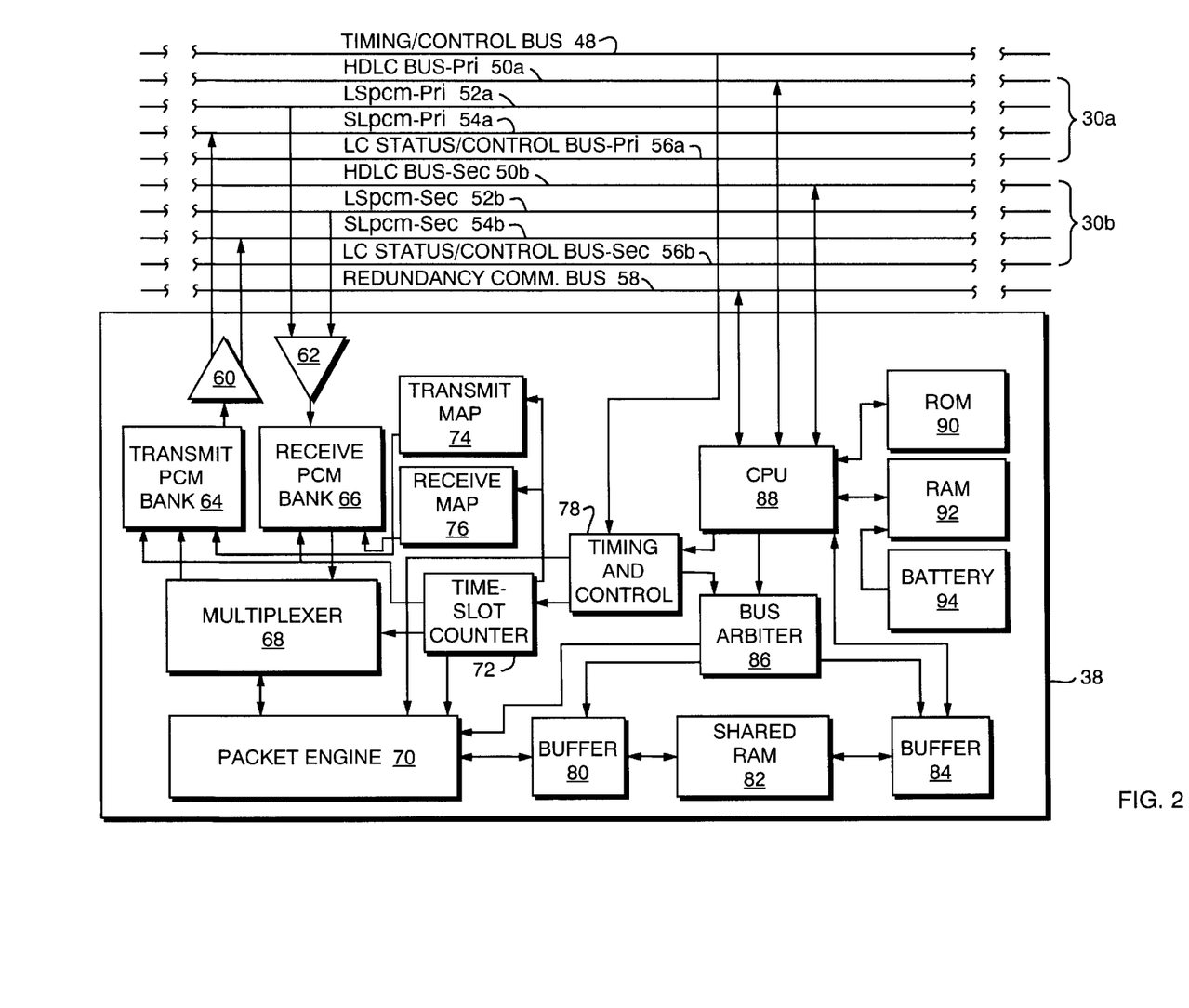
FIG. 2 is a block diagram of the PRI-32 packet engine card shown in FIG. 1.

FIG. 2 is a block diagram of PRI-32 packet engine card 38. Bus drivers and receivers 60 and 62, respectively, are connected in communicating relationship with a time division multiplex (TDM) bus which comprises two communication paths designated LSpcm 52a and SLpcm 54a. LSpcm 52a carries pulse code modulation information in a direction from line cards 26 (FIG. 1) to CPU/matrix card or nodal switch 44a, MFDSP cards 36 and PRI-32 cards 38. Conversely, SLpcm 54a path carries PCM information in a direction from CPU/matrix card or nodal switch 44a, MFDSP cards 36 and PRI-32 cards 38 to line cards 26. In a preferred embodiment, two eight bit parallel buses are used for the LSpcm 52a and SLpcm 54a, respectively. Alternatively, those paths may be implemented by a plurality of multiplexed serial buses, each of which carries a plurality of time slots. It should be understood that other types and configurations of buses may be used to establish appropriate communications between the various cards.

Preferably, paths 52a and 54a are duplicated for the purpose of providing PCM redundancy. Accordingly, each primary bus is denoted by the suffix "Pri" and the redundant or secondary bus by the suffix "Sec".

A CPU 88, which is preferably a Motorola 68EC040 microprocessor, is connected in communicating relationship with primary and secondary HDLC buses 50a and 50b, respectively, as well as timing and control circuitry 78, a buffer 84, a bus arbiter 86, read only memory (ROM) 90 and random access memory (RAM) 92. CPU 88 is also connected in communicating relationship with a redundancy communication bus 58, the functions of which are described below. A battery 94 provides backup power for RAM 92 so that information stored therein is preserved in the event of an interruption of the primary power supply.

A transmit PCM bank 64 is connected in communicating relationship with bus drivers 60. Similarly, a receive PCM bank is connected in communicating relationship with bus receivers 62. Each of PCM banks 64 and 66 is connected to an associated map 74 or 76 as well as to a time slot counter 72. A multiplexer 68, which is also connected to time slot counter 72, is arranged to pass PCM information bidirectionally between PCM banks 64 and 66, on the one hand, and a packet engine 70, on the other hand. A buffer 80 is connected to packet engine 70, a shared RAM 82 and bus arbiter 86.

When programmed in an appropriate fashion, PRI-32 packet engine card 38 may function as an ISDN D channel server for up to 32 D channels or a central packet engine to provide packet switching services for ISDN B or D channels. By virtue of timing signals received via timing/control bus 48, card 38 is synchronized with CPU/matrix card or nodal switch 44a (FIG. 1). Card 38 receives messages and data from, and provide similar information to, CPU/matrix card or nodal switch 44a over HDLC bus 50a. In addition, in response to one or more messages received from CPU/matrix card or nodal switch 44a, card 38 operates to continuously "listen" to information carried in predetermined time slots on LSpcm path 52a (i.e., write the PCM data contained in those time slots into receive PCM bank 66). Stated another way, card 38 must be programmed (or instructed) as to which particular time slots appearing on LSpcm path 52a are carrying ISDN traffic.

Preferably, card 38 may be programmed to listen to up to 256 time slots. Once stored in receive PCM bank 66, such information may be passed via multiplexer 68 to packet engine 70 for processing, then returned to transmit PCM bank 64 for transmission in appropriate time slots on SLpcm path 54*a*.

Figure 3:
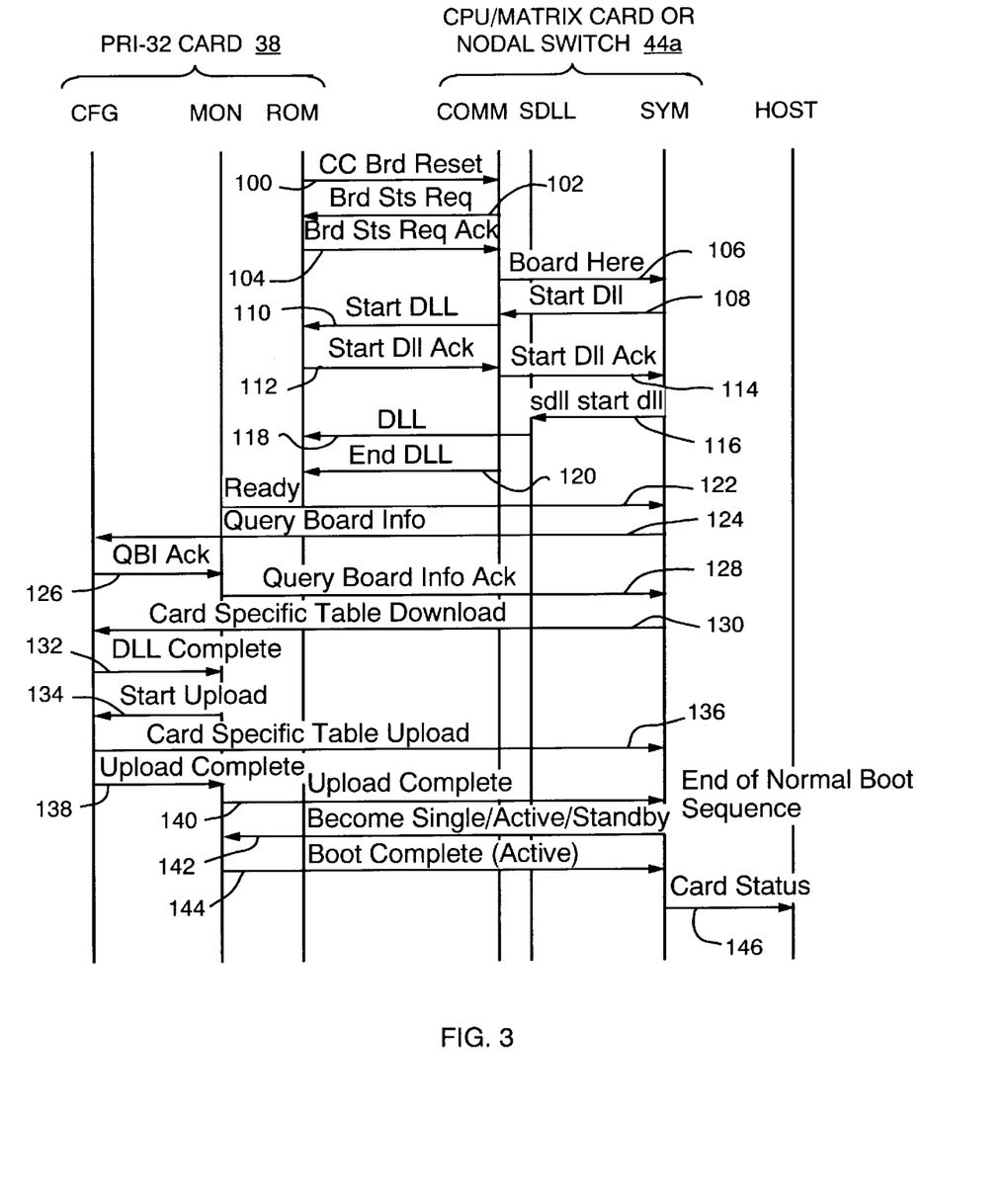
FIG. 3 is a message diagram which illustrates the boot sequence for the packet engine card of FIGS. 1 and 2.

FIG. 3 shows the boot sequence for preparing a packet engine card 38 to assume an active operational state. Each of the vertical lines in FIG. 3 represents a software process or task which is identified by an acronym. The legends "PRI-32," "CPU/Matrix or Nodal Switch" and "Host" identify the respective (hardware) portions of the system on which the processes or tasks run. Each horizontal line represents the transmission of a message from one process or task to another. For purposes of improved clarity, certain functions which are actually carried out by a plurality of messages (such as the dowloading or uploading of operating instructions or configuration information) are represented by a single message.

With reference now to FIGS. 2 and 3, upon an occurrence of a reset, a BOARD RESET message 100 is communicated from ROM 90 on packet engine card 38, via CPU 88 and HDLC bus 50*a*, to a communication (COMM process running on CPU/matrix card or nodal switch 44*a*. The COMM process is generally responsible for sending and receiving all messages over the HDLC bus. The COMM process responds by transmitting a BOARD STATUS REQUEST 102, which is an inquiry used to determine the present operational state of packet engine card 38. BOARD STATUS REQUEST 102 is answered by a BOARD STATUS REQUEST ACKNOWLEDGEMENT 104 which is returned to the COMM process.

Assuming that BOARD STATUS REQUEST ACKNOWLEDGEMENT 104 indicates that packet engine card 38 is ready to proceed with the boot sequence, the COMM process transmits a BOARD HERE message 106 to a SYM process. In response, the SYM process, which is generally responsible for management of all system resources throughout programmable switch 2 (FIG. 1), notes the presence of a packet engine card 38 and, in the event that no valid load is present, issues a START DOWNLOAD message 108 to the COMM process, which in turn issues a START DOWNLOAD message 110 to card 38. In response, START DOWNLOAD ACKNOWLEDGEMENTS 112 and 114 are returned. The SYM process then issues a START DOWNLOAD message 116 to a start download (SDLL) process.

At step 118, general operating instructions for packet engine card 38 are downloaded from the COMM process. Once the download of operating instructions is complete, an END DOWNLOAD message 120 is transmitted from the COMM process to a ROM process (a process which is running in the read only memory located on card 38).

Assuming that packet engine card 38 is prepared to proceed with the boot sequence, a READY message 122 is transmitted from a MON process, which is generally responsible for the boot sequence and redundancy managment for packet engine card 38, to the SYM process. In response, a QUERY BOARD INFORMATION message 124 is transmitted from the SYM process to a configuration (CFG) process running on packet engine card 38. Receipt of message 124 is confirmed by QUERY BOARD INFORMATION ACKNOWLEDGEMENTS 126 and 128.

At this point, if no or insufficient configuration information was previously downloaded or otherwise stored on packet engine card 38, a DOWNLOAD 130 of card-specific tables containing detailed configuration information, such as assignments of active and standby D channels, is made from the SYM process to the CFG process. The CFG process indicates successful completion of that download by transmitting a DOWNLOAD COMPLETE ACKNOWLEDGEMENT 132 to the MON process. This is followed by a START UPLOAD message 134 which is transmitted from the MON process to the CFG process, which in turn is followed by a CARD SPECIFIC TABLE UPLOAD message 136 transmitted to the SYM process. The purpose of that upload is to ensure that current configuration information for packet engine card 38 is preserved by the SYM process on the CPU/matrix card or nodal switch 44*a* for subsequent download in the event that either a reset or a cutover (described below) occurs. The successful completion of that upload, which respresents the end of a normal boot sequence, is signalled by UPLOAD COMPLETE messages 138 and 140.

Next, a BECOME message 142, which instructs packet engine card 38 to assume one of three possible operational states (i.e., single, active or standby) is transmitted from the SYM process to the MON process. If message 142 instructs card 38 to assume the "single" operational status, meaning that there is no redundant packet engine card 38 present and available, then the MON process responds with a BOOT COMPLETE (ACTIVE) message 144, which in turn causes the SYM process to register card 38 as "in service" and to issue a CARD STATUS message 146 to the host. CARD STATUS message 146 reports hardware status information regarding card 38 to the host. At this point, packet engine card 38 is fully booted and ready to be configured.

Figure 4:
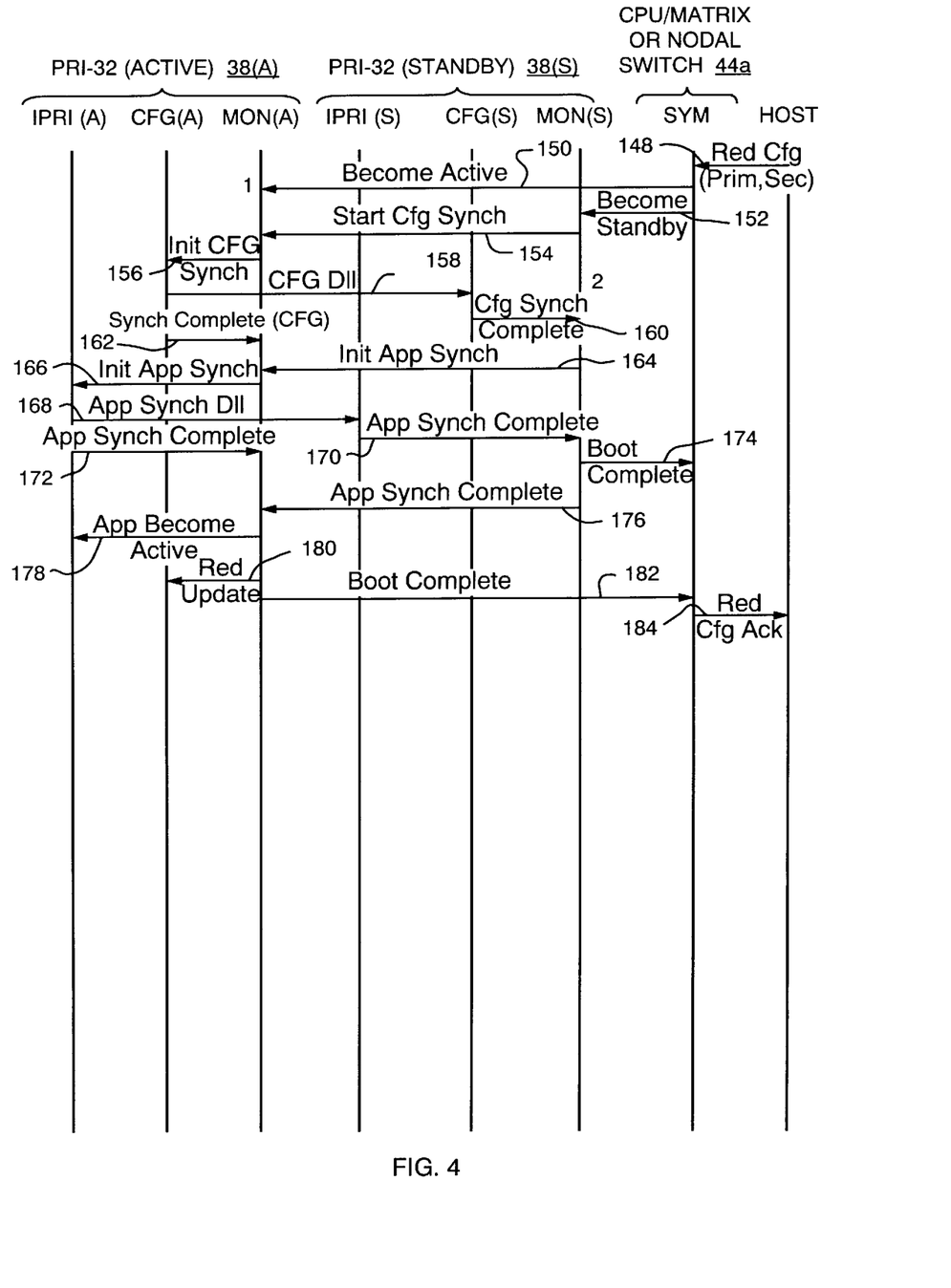
FIG. 4 is a message diagram which illustrates the boot sequence for placing a first packet engine card into an active operational state and a redundant packet engine card into a standby operational state.

With reference now to FIGS. 3 and 4, additional communications are shown which are needed for the case in which two packet engine cards 38 are present and functioning, one of which will be designated as active (card 38(A)) and the other of which will be designated as standby (card 38(S)). Initially, a boot sequence comparable to messages 100 through 140 shown in FIG. 3 will transpire with respect to packet engine card 38(A). Subsequently, a REDUNDANCY CONFIGURATION message 148, which includes data (i.e., card slot numbers) identifying which packet engine card is to become active and which is to become a standby, is transmitted from the host to the SYM process running on the CPU/matrix card or nodal switch 44*a*. The SYM process responds by issuing a BECOME ACTIVE message 150 to the MON process on card 38(A), followed by a BECOME STANDBY message 152 to MON process running on card 38(S).

Receipt of the BECOME STANDBY message 152 causes CPU 88 (FIG. 2) on card 38(S) to establish a communication link or channel to card 38(A) using redundancy communication bus 58. That link or channel is then used by the MON process on card 38(S) to transmit a START CONFIGURATION SYNCHRONIZATION message 154 to the MON process on card 38(A).

The purpose of message 154 is to request that card 38(A), which has already completed its boot sequence as described above, transmit its current configuration information to card 38(S) in order to establish identical configurations. Thus, in response to message 154, the MON process on card 38(A) issues an INITIATE CONFIGURATION SYNCHRONIZATION message 156 to the CFG process on card 38(A), which in turn causes a DOWNLOAD 158 of configuration information from card 38(A) to card 38(S) (again, over redundancy communication bus 58). Assuming that the download is successful, the CFG process on card 38(S) issues a CONFIGURATION SYNCHRONIZATION COM- PLETE message 160 to the MON process on card 38(S). Similarly, the CFG process on card 38(A) issues a SYNCHRONIZATION COMPLETE message to the MON process on card 38(A).

At this point, the MON process on card 38(S) issues an INITIATE APPLICATION SYNCHRONIZATION message 164 to the MON process on the active-designated card 38. That message is a request for card 38(A) to upload its database of detailed operating information to card 38(S), again for the ultimate objective of attaining identical operating states between the active and standby cards. In response to message 164, the MON process on the card 38(A) issues an INITIATE APPLICATION SYNCHRONIZATION message 166 to an ISDN PRI (IPRI) task. The IPRI task responds by uploading 168 the detailed operating information of active card 38(A) to the IPRI task on the standby card 38(S). Once that upload is complete, the IPRI task on card 38(S) issues an APPLICATION SYNCHRONIZATION COMPLETE message 170 to the MON process on that same card. Similarly, the IPRI task on card 38(A) issues an APPLICATION SYNCHRONIZATION COMPLETE message to MON process on that card. Next, the MON process on the standby card issues a BOOT COMPLETE message 174 to the SYM process as well as an APPLICATION SYNCHRONIZATION COMPLETE message 176 to the MON process on card 38(A).

The MON process on card 38(A) issues an APPLICATION BECOMES ACTIVE message 178 to the IPRI task on the same card, followed by a REDUNDANCY UPDATE message 180 to the CFG process and a BOOT COMPLETE message 182 to the SYM process. The SYM process then issues a REDUNDANCY CONFIGURE ACKNOWLEDGEMENT 184 to the host. ACKNOWLEDGEMENT 184 confirms that a redundancy boot sequence was successfully completed.

Figure 5A:
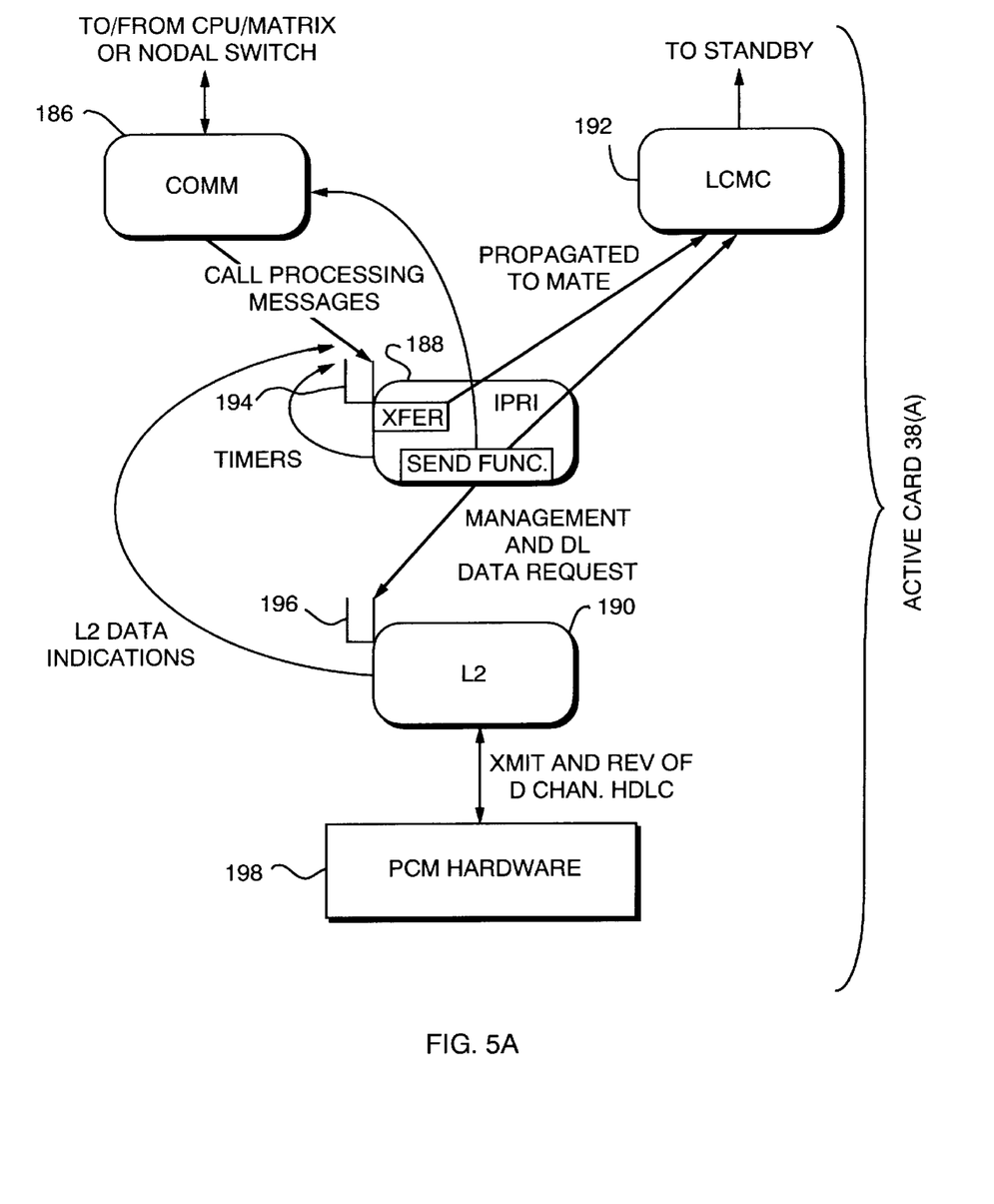
Figure 5A is a highly schematic diagram which illustrates certain software processes and tasks which run on a packet engine card during an active operational state.

With reference now to FIG. 5A, certain processes and tasks which run on a PRI-32 packet engine card 38 while in the active operational state are illustrated. It should be understood that other processes and tasks which are not germane to the present invention may also run on that card. A COMM process 186 is responsible for receiving messages from and sending messages to CPU/matrix card or nodal switch 44a (FIG. 1). Messages received by the COMM process which are call-processing related are passed by that process to a queue 194 which is associated with IPRI task 188. In addition, information related to timers (e.g., expiration of a timer) associated with IPRI task 188 is also provided to queue 194.

A layer 2 (L2) process 190 is responsible for communicating with PCM hardware 198 regarding transmission and reception of (ISDN) D channel information. A queue 196 which is associated with L2 process 190 receives management and ISDN data link (DL) data request messages from IPRI task 188. L2 data indications, which are essentially Q.931 D channel messages, are passed from L2 process 190 to queue 194.

A line card multi-card (LCMC) task 192 is responsible for forwarding all messages (and related data) and timer-related information, as well as L2 data indications (collectively, "events"), from queue 194 to standby (mate) card 38(S).

Figure 5B:
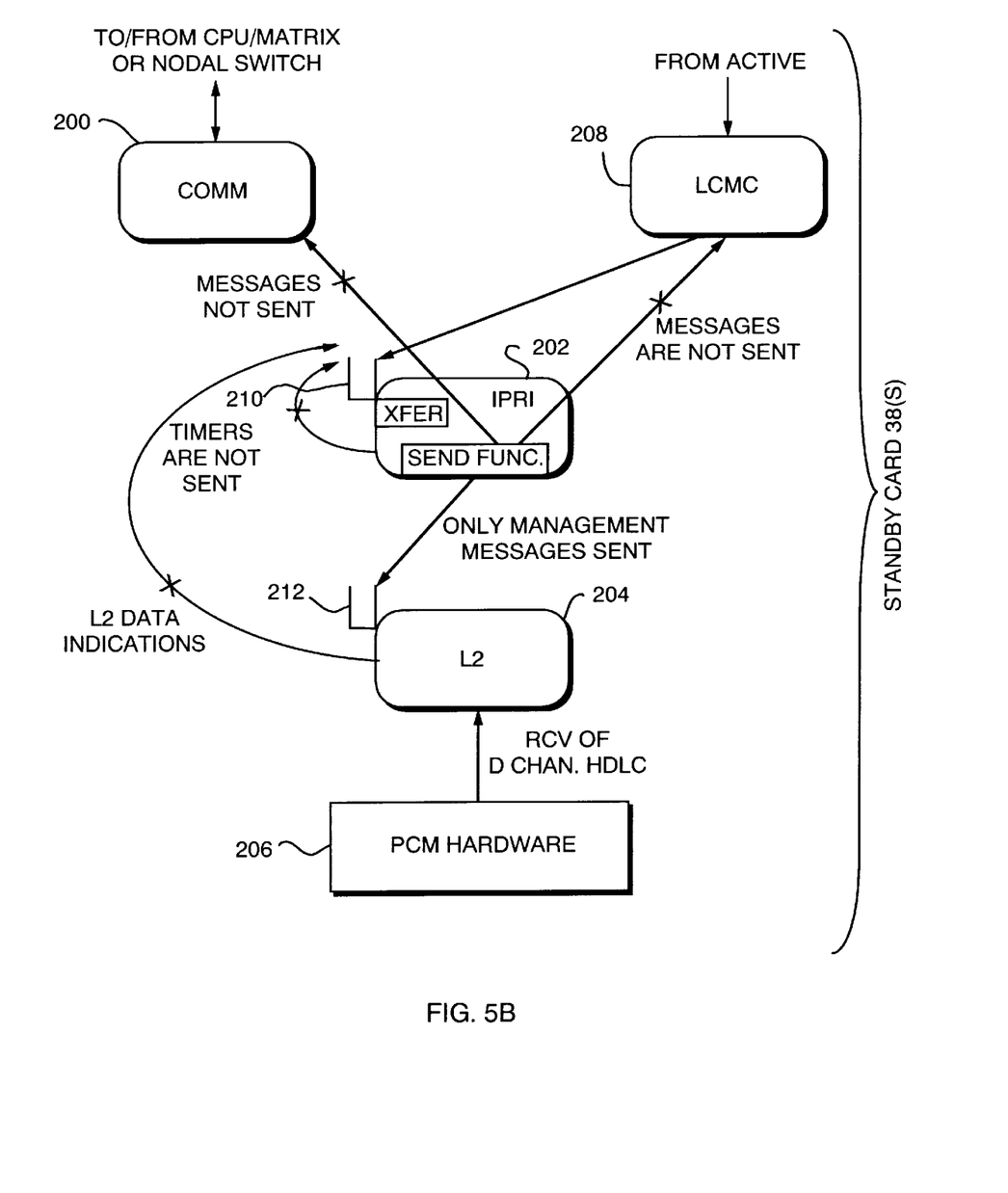
Figure 5B is a highly schematic diagram which illustrates certain software processes and tasks which run on a packet engine card during a standby operational state.

FIG. 5B shows certain processes and tasks which run on a packet engine card while in a standby operational state. The processes and tasks are essentially functional counterparts to those shown in FIG. 5A, with the following exceptions. First, while in the standby mode, the standby card's COMM process 200 does not receive any call processing-related messages from the CPU/matrix card or nodal switch 44a and therefore does not forward any such messages to a queue 210 associated with an IPRI task 202. This is because card 38(A), which is in an active operating mode, has sole responsibility for processing calls.

Second, IPRI task 202 forwards management messages, but not data link data requests (information frames), to a queue 212 associated with an L2 process 204. Similarly, no timer-related information or L2 data indications which originate on standby card 38(S) are placed in queue 210. Instead, events which are transmitted from LCMC process 192 (FIG. 5A) and received by LCMC process 208 are placed in queue 210. Thus, as IPRI task 202 processes the events contained in queue 210, that task should respond in exactly the same way as its counterpart task 188 running on active card 38(A).

Third, IPRI task 202 is blocked from sending any messages to either the COMM process 200 or the LCMC process 208. This is because card 38(S), while in standby mode, is limited to receiving events from an active card and processing those events according to the sequence in which they were received. In this fashion, the operating state of the standby card continuously tracks that of the active card.

Standby card 38(S), while in standby mode, receives D channel information from PCM hardware 206, but does not transmit any information thereto. L2 process 204, by examining the sequence numbers contained within the received frames, is able to determine the sequence numbers of messages transmitted by active card 38(A). As a result, in the event that standby card 38(S) must be brought into service to replace active card 38(A), the standby card 38(S) will have the necessary information to continue the exchange of messages previously handled by active card 38(A).

A cutover from an active card to a standby card may be necessitated by any of a number of possible malfunctions or other conditions: an active card is physically removed; an active card is manually reset; an active card experiences a fault which forces a reset; an active card ceases communication with a CPU/matrix card or nodal switch; an active card is taken out of service by way of an instruction from a host; or a host sends a reset message directed to the active card.

Upon the occurence of an event which necessitates a cutover, the SYM process (running on the CPU/matrix card or nodal switch 44a) issues a BECOME_SINGLE message (like message 142 in FIG. 3) to the MON process running on the standby card 38(S) (FIG. 4). In response, the MON process issues a message to the IPRI task which causes that task to begin functioning as described above in connection with FIG. 5A. At this point, the standby card's operational status has changed from standby to single. As a result of the cutover, the former standby (now "single") card assumes responsibility for all calls which were being processed by the original active card that had reached stable states (i.e., connections existed). Further, as its "single" operational status implies, that card has no communication link or channel to a standby card. Preferably, the host is informed of the change in the card's operational status by way of a message issued from the COMM process.

In the event that the original active card is subsequently repaired or replaced (or another properly functioning card is installed in the switch), that card may be booted as described above, thereby becoming a standby card. In such circumstances, the original standby card, which assumed "single" operational status at the time of the previous cutover, would receive a message changing its operational status to "active." Subsequently, if desired, the active and standby card designations may be reversed as directed by the host or other control device.

It should be understood that multiple standby cards may be provided with respect to a single active card in order to provide even greater redundancy and protection against interruption of service. In such an approach, the active card may establish a communication channel or link to each standby card. Otherwise, communications between the active card and each standby card would be substantially the same as described above.

It should also be understood that the present invention may be used to provide redundancy in connection with any of a variety of hardware devices typically found in telecommunications or other types of systems. In the case of a programmable telecommunications switch like that shown in FIG. 1, the present invention may be used to provide redundancy for line cards 26 or MFDSP cards 36.

While the invention has been particularly shown and described with reference to preferred embodiments thereof, it will be understood by those skilled in the art that various changes in form and details may be made therein without departing from the spirit and scope of the invention. Furthermore, the terms and expressions which have been employed are used as terms of description and not of limitation, and there is no intention, in the use of such terms and expressions, of excluding any equivalents of the features shown and described or portions thereof but it is recognized that various modifications are possible within the scope of the invention claimed.

What is claimed is:

1. A method of providing redundancy for one or more hardware devices in a telecommunications system, said telecommunications system including a host and at least one other processing device, said method comprising:
    performing a boot sequence with respect to a first hardware device;
    designating by said host, via instructions issued by said processing device, said first hardware device as an active device;
    designating by said host, via instructions issued by said processing device, said second hardware device, which is capable of performing substantially the same functions as said first hardware device, as a standby device;
    establishing a communication link between said active and standby devices;
    using said link to communicate information relating to a configuration of said active device to said standby device;
    using said configuration-related information to configure said standby device substantially identically with said active device;
    enabling said active device to commence processing calls;
    receiving pulse code modulation (PCM) information which is destined for said active device substantially simultaneously at both said active and standby devices;
    using said link to communicate information relating to events which affect an operational state of said active device to said standby device; and
    using said event-related information such that an operational state of said standby device continuously tracks the operational state of said active device, whereby should said active device cease to operate properly, said standby device is instructed to assume responsibility for processing calls previously processed by said active device.

2. The method as in claim 1 wherein said active and standby devices each comprise an ISDN packet engine card.

3. The method as in claim 2 wherein said configuration information includes information regarding single, active and standby D channels, whereby redundancy is effectively provided with respect to each of said channels and said active ISDN packet engine.

4. The method as in claim 2 wherein said event-related information includes call-processing related messages and timer-related information.

5. The method as in claim 1 wherein said active device maintains a queue for receiving event-related information which is to be communicated to said standby device.

6. The method as in claim 1 wherein said standby device maintains a queue for receiving event-related information communicated from active device.

7. A programmable telecommunications switch capable of processing ISDN calls and including redundancy with respect to one or more hardware devices, said switch comprising:
    controllable-switching means for dynamically connecting or disconnecting communication paths with respect to various ones of a plurality of ports;
    an interface for connecting said switch in communicating relationship with a host device;
    one or more line cards, connected in communicating relationship with said switching means, for interfacing with at least one digital network; and
    an active ISDN packet engine card, connected in communicating relationship with said one or more line cards and said switching means, operating in a state in which ISDN calls carried by said digital network are processed, said active packet engine card having a communication link with a standby ISDN packet engine card for communicating configuration information and for communicating a stream of the same information relating to events which affect said state received by said active ISDN packet engine card to said standby ISDN packet engine card, connected in communicating relationship with said one or more line cards and said switching means, responsive to information received from the active packet engine card to maintain an operating state which continuously tracks that of the active packet engine card, whereby should the active packet engine card fail to operate properly, said standby packet engine card assumes responsibility for processing said ISDN calls.

8. The switch as in claim 7 wherein said controllable-switching means comprises a CPU/matrix card.

9. The switch as in claim 7 wherein said controllable-switching means comprises a nodal switch.

10. An ISDN packet engine card for use in a telecommunications system, said card comprising:
    first and second banks for transmitting and receiving, respectively, pulse code modulation (PCM) information in a plurality of time slots;
    means for interfacing said first and second banks with one or more communication buses carrying PCM information;
    an ISDN packet engine, connected in communicating relationship with said first and second banks, for processing said received PCM information;
    a source of timing and control information connected in communicating relationship with said first and second banks and said packet engine; and
    a processor, connected in communicating relationship with said timing and control source, one or more control communication buses, and a redundancy communication bus, for controlling said packet engine card and using said redundancy communication bus to support redundant operation by transmitting or receiving redundancy information, said redundancy information including configuration information and information related to events which affect an operational state of said packet engine card.

* * * * *